United States Patent
Takahashi et al.

(10) Patent No.: US 7,438,983 B2
(45) Date of Patent: Oct. 21, 2008

(54) MAGNETIC RECORDING MEDIUM

(75) Inventors: Masatoshi Takahashi, Kanagawa (JP);
Katsuhiko Meguro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 540 days.

(21) Appl. No.: 11/043,966

(22) Filed: Jan. 28, 2005

(65) Prior Publication Data

US 2005/0170217 A1 Aug. 4, 2005

(30) Foreign Application Priority Data

Jan. 30, 2004 (JP) .................. P.2004-023669

(51) Int. Cl.
G11B 5/64 (2006.01)
G11B 5/78 (2006.01)
(52) U.S. Cl. .............. 428/845.1; 428/847.8; 428/847.2; 360/134
(58) Field of Classification Search .............. 428/840.1, 428/847, 847.1, 847.2, 847.3, 847.4, 847.7, 428/848.2, 423.7, 425.5, 480, 692.1, 900; 360/134, 135; 521/48; 522/104
See application file for complete search history.

(56) References Cited

U.S. PATENT DOCUMENTS

| | | | | |
|---|---|---|---|---|
| 6,713,155 | B1 * | 3/2004 | Handa et al. ............. | 428/847.4 |
| 2002/0119346 | A1 * | 8/2002 | Naoe et al. ............... | 428/847.4 |
| 2002/0119349 | A1 * | 8/2002 | Suzuki et al. ............. | 428/847 |
| 2002/0155324 | A1 * | 10/2002 | Murao et al. ............. | 428/847.2 |
| 2003/0215670 | A1 * | 11/2003 | Takahashi et al. ......... | 428/847.4 |

FOREIGN PATENT DOCUMENTS

| EP | 1142936 | * | 10/2001 |
|---|---|---|---|
| JP | 8-45060 A | | 2/1996 |
| JP | 8-227517 A | | 9/1996 |
| JP | 2001-319316 A | | 11/2001 |
| WO | WO 00/79524 | * | 6/2000 |

OTHER PUBLICATIONS

JP 8-227517 Translation and Abstract.*
JP 8-45060 Translation and Abstract.*
JP 2001-319316 Translation and Abstract.*

* cited by examiner

*Primary Examiner*—Carol Chaney
*Assistant Examiner*—Louis Falasco
(74) *Attorney, Agent, or Firm*—Sughrue Mion, PLLC

(57) ABSTRACT

A magnetic recording medium is composed of a nonmagnetic support provided with on one side of the support a magnetic layer containing a ferromagnetic powder and a binder, and a backing layer on the other side of the nonmagnetic support, wherein the nonmagnetic support is a polyester film having an intrinsic viscosity of from 0.40 to 0.60 dl/g, and contains fillers having filler diameters of from 10 to 500 nm at a filler density of from $1/100$ to $50/100$ $\mu m^2$.

11 Claims, No Drawings

MAGNETIC RECORDING MEDIUM

This application is based on Japanese Patent application JP 2004-023669, filed Jan. 30, 2004, the entire content of which is hereby incorporated by reference.

BACKGROUND OF THE INVENTION

1. Technical Field of the Invention

The present invention relates to a magnetic recording medium comprising a nonmagnetic support provided with a magnetic layer directly thereon or via a nonmagnetic layer, and having excellent running durability and electromagnetic conversion characteristics.

2. Description of the Related Art

In the field of magnetic tape, with the prevalence of office computers, such as minicomputers, personal computers and work station, magnetic tapes for recording computer data as external storage media (so-called backup tapes) have been vigorously studied in recent years. For putting magnetic tapes in such uses to practical use, the improvement of recording capacity has been strongly demanded conjointly with the miniaturization of a computer and the increase of information processing performance for achieving high capacity recording and miniaturization.

Magnetic recording media comprising a nonmagnetic support having coated thereon a magnetic layer comprising an iron oxide, a Co-modified iron oxide, $CrO_2$, ferromagnetic metal powder (MP), or hexagonal ferrite powder dispersed in a binder have been conventionally widely used. Of these powders, ferromagnetic metal fine powders and hexagonal ferrite fine powders are known to be excellent in high density recording characteristics.

Magnetic heads working with electromagnetic induction as the principle of operation (an induction type magnetic head) are conventionally used and spread. However, the magnetic heads of this type are approaching their limit for use in the field of higher density recording and reproduction. That is, it is necessary to increase the number of winding of the coil of a reproduction head to obtain larger reproduction output, but when the winding number is increased, the inductance increases and the resistance at high frequency heightens. As a result, the reproduction output lowers. In recent years, reproduction heads that work with magneto-resistance (MR) as the principle of operation are proposed and get to be used in hard discs and the like. The application of the MR head to magnetic tapes is proposed in JP-A-8-227517 (The term "JP-A" as used herein refers to an "unexamined published Japanese patent application".). As compared with the induction type magnetic head, several times of reproduction output can be obtained by using MR head. Further, since an induction coil is not used in MR head, noises coming from instruments, e.g., impedance noises, are greatly reduced, and it has become possible to obtain a great S/N ratio or C/N ratio by lowering the noise coming from magnetic recording media. In other words, good recording and reproduction can be done and high density recording characteristics can be drastically improved by lessening the noise of magnetic recording media hiding behind the instrument noises. Further, it is required of magnetic recording media, in particular, backup tapes for computers, to be excellent in durability and free from defects of data. For securing such excellent electromagnetic conversion characteristics and durability of magnetic recording media, the increase of coercive force (Hc) and orientation property of magnetic powders, the development of protective films of magnetic layers, and the development of lubricants to reduce the friction coefficient between magnetic layers and back layers have been performed. On the other hand, on the side of magnetic recording and reproducing apparatus, as the means for increasing recording capacity per a unit area, shortening of wavelength of recording frequency and narrowing of the track width of a magnetic recording head are advanced. For instance, in cartridge type recording media, it has been tried to increase the capacity by loading a longer tape by thinning the thickness of the tape while maintaining the capacity of a cartridge as it is. A typical example is the increase of the capacity of from DDS2 system to DDS3 system of a backup tape for computer (*Report on Research of the Trends of the Production and Demand of Recording Media in the World and Technical Tendency*, P97, published by Nippon Recording Media Industry Association). Further, the improvement of area recording density has been advanced year by year by narrowing the track width of recording and reproducing heads. In such a system, the control of positioning of recording and reproducing heads and a magnetic recording medium is important. In a tape medium, since more stable running is necessary when a tape runs in a recording/reproducing apparatus, the accuracy of the position of a tape running guide and the position of the flange for regulating a tape is important. However, falling of a magnetic layer, a backing layer and a support from the tape edge occurs when the positioning regulation is too strict. As for the durability of a magnetic layer surface, binders having high durability and lubricants for reducing a friction coefficient are developed, and DLT that is now the mainstream of the backup tape for computer having a tape running speed of 2.5 m/s has been commercialized without generating problems in durability of magnetic layers. However, the influence on error rate by the adhesion of the debris of a magnetic layer, a backing layer and a support to the tape due to falling from the tape edge has been actualized. LTO commercialized in recent years has a tape speed as fast as 5 m/sec, and the problem of adhesion of the debris of a tape edge (edge debris) to a tape and a head has now become a great concern.

For the purpose of preventing a pancake-shaped failure by suppressing high edge of the edge part occurring in a slit process, a magnetic recording medium comprising a polyethylene naphthalate support having a thickness of 4 µm or more, wherein the ratio of Young's modulus of the support in the machine direction to that in the transverse direction is prescribed to be from 0.4 to 1.5, and a viscosity to be from 0.45 to 0.53 is disclosed in JP-A-8-45060.

However, as the latest support of a magnetic recording medium improved in recording density, a sufficient support cannot be ensured only with the above prescription. Regarding the viscosity disclosed in JP-A-8-45060, the unit and the measuring method are not disclosed, so that the invention is unclear. With respect to the material of the support, the description is only concerning polyethylene naphthalate and there is no description of using fillers.

As described above, conventional supports cannot provide a magnetic recording medium corresponding to the requirement of the latest high density recording.

SUMMARY OF THE INVENTION

An object of the present invention is to provide a magnetic recording medium having excellent durability and electromagnetic conversion characteristics.

The means for solving the above problems are as follows.

1) A magnetic recording medium comprising a nonmagnetic support provided with on one side of the support a magnetic layer containing a ferromagnetic powder and a binder, and a backing layer on the other side of the nonmagnetic support, wherein the nonmagnetic support is a polyester film having an intrinsic viscosity of from 0.40 to 0.60 dl/g, and contains fillers having filler diameters of from 10 to 500 nm at a filler density of from $\frac{1}{100}$ to $\frac{50}{100}$ μm$^2$.

2) The magnetic recording medium according to 1), wherein a volume of the ferromagnetic powder is $0.1 \times 10^{-18}$ to $8 \times 10^{-18}$ ml.

The invention can provide a magnetic recording medium not generating edge debris, excellent in durability, capable of maintaining good error rate and excellent in electromagnetic conversion characteristics by using a polyester film having specific intrinsic viscosity and filler density as the nonmagnetic support. The present invention is particularly suitable for a magnetic recording medium of ½ inch wide for computer used in a system of recording and reproducing at a speed of 3 m/sec or more and the above effects are effectively exhibited.

DETAILED DESCRIPTION OF THE INVENTION

According to related art, in a magnetic recording medium used in a computer system using a ½ inch wide tape at a tape speed of 3 m/sec or more, the magnetic layer and the support are peeled and fallen from the tape edge due to the contact of the slit edge of the tape with the tape running guide by repeating running. As a result of various analyses of this phenomenon, the present inventors have found that the falling is related with the filler amounts contained in supports, and various examinations based on the above fact resulted in the present invention.

Fillers contained in nonmagnetic supports are generally selected from Ca and Si fine particles. Fillers are added to improve the handling properties in the manufacture of support and magnetic recording media, or for the purpose of securing running property in magnetic recording media not having a backing layer by optimizing addition amount and particle size.

The present inventors have found that when the number of the filler contained in the nonmagnetic support of the cross section of a tape is in a certain range, and a polyester film having specific intrinsic viscosity is used as the nonmagnetic support, the edge damage due to repeating running is reduced, falling of the powder decreases, and a magnetic recording medium excellent in durability can be obtained.

That is, the intrinsic viscosity of the polyester film support is from 0.40 to 0.60 dl/g, preferably from 0.46 to 0.56 dl/g.

The intrinsic viscosity in the invention means the intrinsic viscosity of the polyester molecules at large constituting a nonmagnetic support (hereinafter also referred to as merely "support"). The intrinsic viscosity is obtained by dissolving a nonmagnetic support (excluding insoluble solids content such as powder) in a mixed solvent comprising phenol/1,1,2, 2-tetrachloroethane (60/40 by weight), taking the concentration of the solution as the axis of abscissa and the relative viscosity corresponding to the solution measured at 25° C. by Ubbelohde's viscometer as the axis of ordinate, plotting the obtained points, and extrapolating the point of zero of concentration.

It is necessary that a filler having a filler size of from 10 to 500 nm, preferably from 10 to 250 nm, be present in the cross section of a nonmagnetic support for use in the invention in filler density of from $\frac{1}{100}$ to $\frac{50}{100}$ μm$^2$, preferably from $\frac{1}{100}$ to $\frac{20}{100}$ μm$^2$.

In the invention a filler size and filler density are defined as follows.

A small piece of a nonmagnetic support or a magnetic recording medium is embedded in an epoxy resin adhesive, the tip of the embedded block is made an appropriate shape and size, a hyper thin slice of the support part prepared with a microtome (a cross section perpendicular to the coating surface of the nonmagnetic support) is placed on a mesh, thus a test sample for filler observation is obtained. The test sample is photographed with a transmission electron microscope model H-9000 (manufactured by Hitachi Limited) at a magnification of 3,000 to 50,000 times according to the size of the filler, and the cross section of the support is printed on a photographic paper in total magnification of from 10,000 to 200,000 times. Preferably, the photograph is put on an image analyzer KS-400 digitizer (manufactured by Kontron), and the outline of the filler is traced (the filler preferably comprises primary particles free from agglomerate, but when a plurality of particles are agglomerated, the agglomerate is taken as the filler) to measure an equivalent-circle diameter. The average of 200 particles is taken as a filler size, and a filler density is computed from the number of filler particles present in the specified area of the image.

In the invention, when the intrinsic viscosity of a nonmagnetic support and the filler size and the filler density of the filler contained in the support are in the above ranges, a film-forming property and film strength can be secured, and a slitting property (the shape of an edge) in a slitting process is maintained well, so that edge damage is restrained. When the intrinsic viscosity is less than 0.40 dl/g, the degree of polymerization is low, so that a film-forming property and film strength are not improved, and when it exceeds 0.60 dl/g, a slitting property in a slitting process lowers. If a filler size is too large, electromagnetic conversion characteristics decreases, and when filler density is too high as too low, edge damage increases. When filler density is less than $\frac{1}{100}$ μm$^2$, the lubricating properties of the support surface are insufficient and handling in the production process becomes difficult.

Polyester films used as the nonmagnetic support of the invention are polyesters comprising dicarboxylic acid and diol such as polyethylene terephthalate and polyethylene naphthalate.

As dicarboxylic acid components of the main compositional component, terephthalic acid, isophthalic acid, phthalic acid, 2,6-naphthalenedicarboxylic acid, 2,7-naphthalenedicarboxylic acid, diphenyl sulfone dicarboxylic acid, diphenyl ether dicarboxylic acid, diphenylethanedicarboxylic acid, cyclohexanedicarboxylic acid, diphenyldicarboxylic acid, diphenyl thiother dicarboxylic acid, diphenyl ketone dicarboxylic acid, and phenylindanedicarboxylic acid can be exemplified.

As diol components, ethylene glycol, propylene glycol, tetramethylene glycol, cyclohexanedimethanol, 2,2-bis(4-hydroxyphenyl)propane, 2,2-bis(4-hydroxyethoxyphenyl) propane, bis(4-hydroxyphenyl)sulfone, bisphenol fluorene dihydroxy ethyl ether, diethylene glycol, neopentyl glycol, hydroquinone, and cyclohexanediol can be exemplified.

Of polyesters comprising these main compositional components, polyesters mainly comprising terephthalic acid and/or 2,6-naphthalenedicarboxylic acid as the dicarboxylic acid components, and ethylene glycol and/or 1,4-cyclohexanedimethanol as the diol components are preferred for transparency, mechanical strength and dimensional stability.

Of these polyesters, polyesters comprising polyethylene terephthalate or polyethylene-2,6-naphthalate as the main compositional components, polyester copolymers comprising terephthalic acid, 2,6-naphthalenedicarboxylic acid and ethylene glycol, and polyesters comprising mixtures of two or more of these polyesters as the main compositional components are preferred. Polyesters comprising polyethylene-2,6-naphthalate as the main compositional component are particularly preferred.

Polyesters constituting biaxially stretched polyester films for use in the invention may be copolymerized with other copolymer components or mixed with other polyesters so long as the effect of the invention is not prevented. As the examples thereof, the above-exemplified dicarboxylic acid components and diol components and polyesters comprising these compounds can be exemplified.

Polyesters for use in the invention may be copolymerized with aromatic dicarboxylic acids having a sulfonate group or ester formable derivatives thereof, dicarboxylic acids having a polyoxyalkylene group or ester formable derivatives thereof, or diols having a polyoxyalkylene group, for the purpose of being hard to cause delamination at film forming time.

In the point of polymerization reactivity of polyesters and transparency of films, sodium 5-sulfoisophthalate, sodium 2-sulfoterephthalate, sodium 4-sulfophthalate, sodium 4-sulfo-2,6-naphthalenedicarboxylate, compounds obtained by substituting the sodium of the above compounds with other metals (e.g., potassium, lithium, etc.), ammonium salt, or phosphonium salt, ester formable derivatives thereof, polyethylene glycol, polytetramethylene glycol, polyethylene glycol-polypropylene glycol copolymer, and compounds obtained by making carboxyl groups of the hydroxyl groups at both terminals of these compounds by oxidation and the like are preferred.

The proportion of the copolymerization for this purpose is preferably from 0.1 to 10 mol % based on the dicarboxylic acids constituting the polyesters.

Further, for the purpose of heat resistance, bisphenol compounds and compounds having a naphthalene ring or a cyclohexane ring can be copolymerized. The proportion of copolymerization is preferably from 1 to 20 mol % based on the dicarboxylic acids constituting the polyesters.

The synthesizing method of the polyesters for use in the invention is not particularly restricted and they can be manufactured by conventional manufacturing methods. For example, a direct esterification method of directly esterification reacting dicarboxylic acid component and diol component, and an ester exchange method of performing ester exchange reaction of dialkyl ester as the dicarboxylic acid component and diol component in the first place, which is then polymerized by heating under reduced pressure to remove the excessive diol component can be used. At this time, if necessary, an ester exchange catalyst, a polymerization reaction catalyst or a heat resisting stabilizer can be added.

Further, one or two or more kinds of various additives, such as a coloring inhibitor, an antioxidant, a crystal nucleus agent, a sliding agent, a stabilizer, a blocking preventive, an ultraviolet absorber, a viscosity controller, a defoaming and clarifying agent, an antistatic agent, a pH adjustor, a dye, a pigment and a reaction stopper may be added in each process of synthesis.

In the synthesis of polymers of the materials of nonmagnetic supports for use in the invention, the adjusting method of intrinsic viscosity is not particularly restricted, and intrinsic viscosity can be adjusted by controlling, e.g., the reaction time of the polymerization of a material monomer, reaction temperature, a reaction solvent, pressure, the concentration of a material monomer, and catalyst. Further, as other method, a reaction solution is taken out according to the progress of the reaction in synthesis to measure the viscosity, and the reaction may be stopped when desired viscosity is obtained. In addition, a method of investigating the correspondence of the intrinsic viscosity and the torque applied to the stirrer of the polymerization tank in advance, and stopping the polymerization reaction when the prescribed torque is reached can be exemplified. Since the synthesis of polyester is a polycondensation reaction, it is also possible to use a method of investigating in advance the correspondence of the intrinsic viscosity and the amount of water (in the case of direct polymerization) or alcohol (in the case of ester exchange reaction) discharged out of the reaction system at the time of polymerization, and stopping the polymerization reaction at the stage when the prescribed amount of water or alcohol is discharged. As another method, it is also preferred to advance polymerization once to reach the intrinsic viscosity exceeding the prescribed range, investigating in advance the correspondence of intrinsic viscosity and melt viscosity, and controlling, at the film-forming time, the residence time of the polymer in extruder before melt and/or after melt so that the melt viscosity comes into the prescribed range. The above methods are described as examples and the present invention is not limited to these methods.

Polyester films in the invention have a Young's modulus in the machine direction of preferably from 7.0 to 8.6 GPa, in the transverse direction of from 5.4 to 8.0 GPa. If the Young's modulus in the machine direction of a polyester film exceeds 8.6 GPa, when the film is used as a magnetic tape for digital use, the striking sound of the rotating head of a digital video recorder on the tape produces resonance, which is not preferred. While when the Young's modulus in the transverse direction is less than 5.4 GPa, the strength of the magnetic tape in the transverse direction is insufficient, so that the tape is liable to be folded by a guide pin for regulating tape pass in running, which is not preferred.

A filler to be added to a nonmagnetic support is selected from inorganic powders, e.g., spherical silica, colloidal silica, titanium oxide and alumina, and organic fillers, e.g., crosslinked polystyrene and silicone resins. The average primary particle size of the filler to be used is from 10 to 500 nm, preferably from 10 to 300 nm, and more preferably from 10 to 200 nm.

The mode of distribution of a filler in the cross section of a support is not especially restricted and can be designed optionally. A filler can be distributed in a specific direction, in a thickness direction, or in a breadth direction, may have the difference in an abundance of frequency and may have gradations by the addition amount of a filler, dispersion conditions, the melting temperature of the polymer and stretching conditions.

A nonmagnetic support in the invention may comprise two or more layers. In this case, it is sufficient that a nonmagnetic support as a whole should satisfy intrinsic viscosity, a filler size and filler density, but preferably each layer satisfies these.

The volume of the ferromagnetic powder contained in the magnetic layer of the magnetic recording medium in the invention is preferably $(0.1\text{-}8) \times 10^{-18}$ ml, more preferably $(0.5\text{-}5) \times 10^{-18}$ ml. When the volume of the ferromagnetic powder is in this range, the reduction of magnetic characteristics due to thermal fluctuation can be effectively inhibited and, at the same time, good C/N (S/N) can be obtained while maintaining low noise. As the ferromagnetic powder, ferromagnetic metal powder and hexagonal ferrite powder are preferably used.

The volume of ferromagnetic powder can be obtained as follows.

In the case of ferromagnetic metal powder, the volume is obtained from a major-axis length and a minor-axis length supposing the shape as a cylinder. In the case of hexagonal ferrite powder, the volume is obtained from a tabular diameter and an axis length (a tabular thickness) supposing the shape as a hexagonal column.

The size of magnetic powder is obtained as follows. An appropriate amount of a magnetic layer is peeled off. n-Butylamine is added to 30 to 70 mg of the peeled magnetic layer, they are sealed in a glass tube and set on a pyrolysis unit, and heated at 140° C. for about one day. After cooling, the content is taken out of the glass tube and centrifuged to separate the liquid and the solid content.

The separated solid content is washed with acetone, whereby a powder sample for TEM is obtained. The particle of the sample is photographed with a transmission electron microscope model H-9000 (manufactured by Hitachi Limited) at a magnification of 100,000 times, and the particle is printed on a photographic paper in total magnification of from 500,000 times. The aimed magnetic particle is selected from the photographs of particles and put on an image analyzer KS-400 digitizer (manufactured by Kontron), and the outline of the particle is traced to measure each particle size. The sizes of 500 particles are measured, and the average of the 500 particles is taken as an average particle size.

The layer constitution of the magnetic recording medium in the invention is described below. The layer constitution of the magnetic recording medium in the invention is not particularly restricted so long as it comprises a support having at least a magnetic layer on one side of the support, and a backing layer on the other side of the support. For example, a nonmagnetic layer may be provided between a support and a magnetic layer. In addition, the magnetic recording medium in the invention may be provided with a lubricant layer and various coating films for the protection of a magnetic layer on the magnetic layer. An undercoat layer (an easy adhesive layer) can be provided between a support and a magnetic layer or nonmagnetic layer for the purpose of improving adhesion of a coating film and a support.

Constitution comprising a nonmagnetic layer (a lower layer) and a magnetic layer (an upper layer) can be provided by coating an upper magnetic layer on a lower layer while the lower layer is still wet (W/W) or after drying (W/D).

Simultaneous or successive wet coating is preferred from the productivity. In the multilayer constitution in the invention, an upper layer and a lower layer can be formed at the same time by simultaneous or successive wet coating (W/W), so that surface treatment process such as calendering process can be effectively utilized, and the surface roughness of the upper magnetic layer can be bettered even a hyper thin layer.

The constitutional elements of the magnetic recording medium in the invention are described in further detail below.

[Magnetic Layer]

Ferromagnetic Metal Powder:

Ferromagnetic metal powders for use in the magnetic layer in the magnetic recording medium of the invention are not particularly restricted so long as they mainly comprise Fe (including alloys), and ferromagnetic alloy powders mainly comprising α-Fe are preferred. Ferromagnetic metal powders may contain, in addition to the prescribed atoms, the following atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. It is preferred to contain at least one of Al, Si, Ca, Y, Ba, La, Nd, Co, Ni and B, in addition to α-Fe, and Co, Al and Y are particularly preferably contained. Further specifically, the content of Co is preferably from 10 to 40 atomic %, Al is from 2 to 20 atomic %, and Y is preferably from 1 to 15 atomic %, each based on Fe.

These ferromagnetic metal powders may be treated with the later-described dispersants, lubricants, surfactants and antistatic agents in advance before dispersion. A small amount of water, hydroxide or oxide may be contained in ferromagnetic metal powders. Ferromagnetic metal powders preferably have a moisture content of from 0.01 to 2%. It is preferred to optimize the moisture content of ferromagnetic metal powders by selecting the kinds of binders. The pH of ferromagnetic metal powders is preferably optimized by the combination with the binder to be used. The pH range is from 6 to 12, preferably from 7 to 11. Ferromagnetic powders sometimes contain soluble inorganic ions, such as Na, Ca, Fe, Ni, Sr, $NH_4$, $SO_4$, Cl, $NO_2$ and $NO_3$. It is preferred that these inorganic ions are substantially not contained, but the properties of ferromagnetic powders are not particularly affected if the total content of each ion is about 300 ppm or less. Ferromagnetic powders for use in the invention preferably have less voids and the value of the voids is preferably 20% by volume or less, and more preferably 5% by volume or less.

The crystallite size of ferromagnetic metal powders is preferably from 8 to 20 nm, more preferably from 10 to 18 nm, and particularly preferably from 12 to 16 nm. The crystallite size is the average value obtained from the half value width of diffraction peak with an X-ray diffractometer (RINT2000 series, manufactured by Rigaku Denki Co.) on the conditions of radiation source CuKα1, tube voltage 50 kV and tube current 300 mA by Scherrer method.

Ferromagnetic metal powders have a specific surface area ($S_{BET}$) measured by a BET method of preferably 30 $m^2/g$ or more and less than 50 $m^2/g$, more preferably from 38 to 48 $m^2/g$. When the specific surface area of ferromagnetic metal powders is in this range, good surface properties are compatible with low noise. The pH of ferromagnetic metal powders is preferably optimized by the combination with the binder to be used. The pH range is from 4 to 12, preferably from 7 to 10. Ferromagnetic metal powders may be subjected to surface treatment with Al, Si, P or oxides of them, if necessary, and the amount of the surface-treating compound is from 0.1 to 10% based on the amount of the ferromagnetic metal powders. By the surface treatment, the adsorption amount of lubricant, e.g., fatty acid, preferably becomes 100 $mg/m^2$ or less. Ferromagnetic metal powders sometimes contain soluble inorganic ions, such as Na, Ca, Fe, Ni and Sr, but the properties of ferromagnetic metal powders are not particularly affected if the content is 200 ppm or less. Ferromagnetic powders for use in the invention preferably have less voids and the value of the voids is preferably 20% by volume or less, and more preferably 5% by volume or less.

The shape of ferromagnetic metal powders is not especially restricted, and any shape such as an acicular, granular, ellipsoidal or tabular shape may be used, but it is preferred to use acicular ferromagnetic powder. When acicular ferromagnetic metal powders are used, the acicular ratio is preferably from 4 to 12, more preferably from 5 to 12. The coercive force (Hc) of ferromagnetic metal powders is preferably from 159.2 to 238.8 kA/m (from 2,000 to 3,000 Oe), more preferably from 167.2 to 230.8 kA/m (from 2,100 to 2,900 Oe). The saturation magnetic flux density of ferromagnetic metal powders is preferably from 150 to 300 mT (1,500 to 3,000 G), more preferably from 160 to 290 mT. The saturation magnetization (σs) is preferably from 140 to 170 $A·m^2/kg$ (140 to 170 emu/g), more preferably from 145 to 160 $A·m^2/kg$. SFD (Switching Field Distribution) of magnetic powders themselves is preferably small, preferably 0.8 or less. When SFD is 0.8 or less, electromagnetic conversion characteristics are excellent, high output can be obtained, reversal of magnetization becomes sharp and peak shift is less, therefore, suitable for high density digital magnetic recording. For achieving small Hc distribution, making particle size distribution of goethite in ferromagnetic metal powders good, using monodispersed $\alpha$-$Fe_2O_3$, and preventing sintering are effective methods.

Ferromagnetic metal powders obtained by well-known methods can be used in the invention, and such methods include a method of reducing a water-containing iron oxide having been subjected to sintering preventing treatment, or an iron oxide with reducing gas, e.g., hydrogen, to thereby obtain Fe or Fe—Co particles; a method of reducing a composite organic acid salt (mainly an oxalate) with reducing gas, e.g., hydrogen; a method of thermally decomposing a metal carbonyl compound; a method of reduction by adding a reducing agent, e.g., sodium boron hydride, hypophosphite or hydrazine, to an aqueous solution of a ferromagnetic metal; and a method of evaporating a metal in low pressure inert gas to thereby obtain fine powder. The thus-obtained ferromagnetic metal powders are subjected to well-known gradual oxidation treatment. As such treatment, a method of forming an oxide film on the surfaces of ferromagnetic metal powders by reducing a water-containing iron oxide or an iron oxide with reducing gas, e.g., hydrogen, and regulating partial pressure of oxygen-containing gas and inert gas, the temperature and time is less in demagnetization and preferred.

Ferromagnetic Hexagonal Ferrite Powder:

The examples of ferromagnetic hexagonal ferrite powders include barium ferrite, strontium ferrite, lead ferrite, calcium ferrite, and Co substitution products of these ferrites. More specifically, magnetoplumbite type barium ferrite and strontium ferrite, magnetoplumbite type ferrites having covered the particle surfaces with spinel, and magnetoplumbite type barium ferrite and strontium ferrite partially containing spinel phase are exemplified. Ferromagnetic hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, ferromagnetic hexagonal ferrite powders containing the following elements can be used, e.g., Co—Zn, Co—Ti, Co—Ti—Zr, Co—Ti—Zn, Ni—Ti—Zn, Nb—Zn—Co, Sb—Zn—Co and Nb—Zn. According to starting materials and manufacturing methods, specific impurities may be contained.

The particle sizes of ferromagnetic hexagonal ferrite powders in the invention are sizes satisfying the above specified volume. The average aspect ratio [the average of (tabular diameter/tabular thickness)] of ferromagnetic hexagonal ferrite powders is from 1 to 15, preferably from 1 to 7. When the average aspect ratio of ferromagnetic hexagonal ferrite powders is in the range of from 1 to 15, sufficient orientation can be attained while maintaining high packing density in a magnetic layer and, at the same time, the increase of noise due to stacking among particles can be prevented. The specific surface area ($S_{BET}$) measured by a BET method of particles in the above particle size range is from 10 to 200 $m^2/g$. The specific surface area nearly coincides with the calculated value from the tabular diameter and the tabular thickness of a particle.

The distribution of tabular diameter and tabular thickness of ferromagnetic hexagonal ferrite powders is generally preferably as narrow as possible. Tabular diameter and tabular thickness of particles can be compared in numerical values by measuring 500 particles selected randomly from TEM photographs. The distributions of tabular diameter and tabular thickness of particles are in many cases not regular distributions, but when expressed in the standard deviation to the average size by calculation, σ/average size is from 0.1 to 2.0. For obtaining narrow particle size distribution, it is efficient to make a particle-forming reaction system homogeneous as far as possible, and to subject particles formed to distribution-improving treatment as well. For instance, a method of selectively dissolving superfine particles in an acid solution is also known.

The coercive force (Hc) of hexagonal ferrite powders can be made from 159.2 to 238.8 kA/m (from 2,000 to 3,000 Oe), but Hc is preferably from 175.1 to 222.9 kA/m (from 2,200 to 2,800 Oe), and more preferably from 183.1 to 214.9 kA/m (from 2,300 to 2,700 Oe). However, when the saturation magnetization ($\sigma_s$) of the head exceeds 1.4 T, it is preferred that Hc is 159.2 kA/m or less. Coercive force (Hc) can be controlled by the particle size (tabular diameter and tabular thickness), the kinds and amounts of the elements contained in the hexagonal ferrite powder, the substitution sites of the elements, and the particle-forming reaction conditions.

The saturation magnetization ($\sigma_s$) of hexagonal ferrite powders is from 40 to 80 $A \cdot m^2/kg$ (emu/g). Saturation magnetization ($\sigma_s$) is preferably higher, but it has the inclination of becoming smaller as particles become finer. For improving saturation magnetization ($\sigma_s$), compounding spinel ferrite to magnetoplumbite ferrite, and the selection of the kinds and the addition amount of elements to be contained are well known. It is also possible to use W-type hexagonal ferrite. In dispersing magnetic powders, the particle surfaces of magnetic particles may be treated with dispersion media and substances compatible with the polymers. Inorganic and organic compounds are used as surface-treating agents. For example, oxides or hydroxides of Si, Al and P, various kinds of silane coupling agents and various kinds of titanium coupling agents are primarily used. The addition amount of these surface-treating agents is from 0.1 to 10 weight % based on the weight of the magnetic powder. The pH of magnetic powders is also important for dispersion, and pH is generally from 4 to 12 or so. The optimal value of pH is dependent upon the dispersion media and the polymers. Taking the chemical stability and storage stability of the medium into consideration, pH of from 6 to 11 or so is selected. The moisture content in magnetic powders also affects dispersion. The optimal value of the moisture content is dependent upon the dispersion media and the polymers, and the moisture content of from 0.01 to 2.0% is selected in general.

The manufacturing methods of ferromagnetic hexagonal ferrites include the following methods and any of these methods can be used in the invention with no restriction: (1) a glass crystallization method comprising the steps of mixing metallic oxide which substitutes barium oxide iron and boron oxide as a glass-forming material so as to make a desired ferrite composition, melting and then quenching the ferrite composition to obtain an amorphous product, treating by reheating, washing and pulverizing the amorphous product, to thereby obtain barium ferrite crystal powder; (2) a hydro-thermal reaction method comprising the steps of neutralizing a solution of barium ferrite composition metallic salt with an alkali, removing the byproducts produced, heating the liquid phase at 100° C. or more, washing, drying and then pulverizing, to thereby obtain barium ferrite crystal powder; and (3) a coprecipitation method comprising the steps of neutralizing a solution of barium ferrite composition metallic salt with an alkali, removing the byproducts produced and drying, treating the system at 1,100° C. or less, and then pulverizing to obtain barium ferrite crystal powder. Ferromagnetic hexagonal ferrite powders may be subjected to surface treatment with Al, Si, P or oxides of them, if necessary, and the amount of the surface-treating compound is from 0.1 to 10% based on the amount of the ferromagnetic powders. By the surface treatment, the adsorption amount of lubricant, e.g., fatty acid, preferably becomes 100 mg/m² or less. Ferromagnetic powders sometimes contain soluble inorganic ions, such as Na, Ca, Fe, Ni and Sr, but it is preferred that these inorganic ions are not substantially contained, but the properties of ferromagnetic powders are not particularly affected if the amount is 200 ppm or less.

Binder:

Conventionally well-known thermoplastic resins, thermosetting resins, reactive resins and the mixtures of these resins are used as a binder in the invention. The examples of thermoplastic resins include polymers or copolymers containing, as the constituting unit, vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal or vinyl ether; polyurethane resins and various rubber resins.

The examples of thermosetting resins and reactive resins include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. Thermoplastic resins and thermosetting resins are described in detail in *Plastic Handbook*, Asakura Shoten.

When an electron beam-curable resin is used in a magnetic layer, not only film strength and durability are improved but also surface smoothness and electromagnetic conversion characteristics are further improved. The examples of these resins and manufacturing methods are disclosed in JP-A-62-256219 in detail.

The above resins can be used alone or in combination. It is particularly preferred to use polyurethane resins. It is more preferred to use hydrogenated bisphenol A; polyurethane resins obtained by reacting a compound having a cyclic structure such as polypropylene oxide adduct of hydrogenated bisphenol A, polyol having alkylene oxide chain and molecular weight of from 500 to 5,000, polyol having a cyclic structure and molecular weight of from 200 to 500 as the chain extender, and organic diisocyanate, and introducing a polar group thereto; polyurethane resins obtained by reacting aliphatic dibasic acid such as succinic acid, adipic acid or sebacic acid, polyester polyol comprising aliphatic diol having a branched alkyl side chain and not having a cyclic structure such as 2,2-dimethyl-1,3-propanediol, 2-ethyl-2-butyl-1,3-propanediol, or 2,2-diethyl-1,3-propanediol, aliphatic diol having a branched alkyl side chain and having 3 or more carbon atoms such as 2-ethyl-2-butyl-1,3-propanediol or 2,2-diethyl-1,3-propanediol as the chain extender, and an organic diisocyanate compound, and introducing a polar group thereto; or polyurethane resins obtained by reacting a compound having a cyclic structure such as dimer diol, a polyol compound having a long alkyl chain, and organic diisocyanate, and introducing a polar group thereto.

The average molecular weight of polar group-containing polyurethane resins usable in the invention is preferably from 5,000 to 100,000, more preferably from 10,000 to 50,000. When the average molecular weight is 5,000 or more, the obtained magnetic layer is not accompanied by the reduction of physical strength, such as the brittleness of the layer, and the durability of the magnetic recording medium is not influenced. While when the average molecular weight is 100,000 or less, the solubility in a solvent does not decrease, so that good dispersibility can be obtained, in addition, the coating viscosity in the prescribed concentration does not increase, so that good working properties can be obtained and handling becomes easy.

As the polar groups contained in the above polyurethane resins, —COOM, —SO$_3$M, —OSO$_3$M, —P=O(OM)$_2$, —O—P=O(OM)$_2$ (wherein M represents a hydrogen atom or an alkali metal salt group), —OH, —NR$_2$, —N$^+$R$_3$ (wherein R represents a hydrocarbon group), an epoxy group, —SH and —CN are exemplified. Polyurethane resins to which one or more of these polar groups are introduced by copolymerization or addition reaction can be used. When these polar group-containing polyurethane resins have an OH group, to have a branched OH group is preferred from the aspects of curability and durability, to have from 2 to 40 branched OH groups per a molecule is preferred, and to have from 3 to 20 groups is more preferred. The amount of these polar groups is from $10^{-1}$ to $10^{-8}$ mol/g, preferably from $10^{-2}$ to $10^{-6}$ mol/g.

The specific examples of binders include VAGH, VYHH, VMCH, VAGF, VAGD, VROH, VYES, VYNC, VMCC, XYHL, XYSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.), Nippollan N2301, N2302 and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Ink and Chemicals Inc.), Vylon UR8200, UR8300, UR8700, RV530 and RV280 (manufactured by Toyobo Co., Ltd.), Daipheramine 4020, 5020, 5100, 5300, 9020, 9022 and 7020 (manufactured by Dainichiseika Color & Chemicals Mfg. Co., Ltd), MX5004 (manufactured by Mitsubishi Kasei Corp.), Sanprene SP-150 (manufactured by Sanyo Chemical Industries, Ltd.), Saran F310 and F210 (manufactured by Asahi Kasei Corporation).

The addition amount of binders for use in a magnetic layer of the invention is from 5 to 50 weight %, preferably from 10 to 30 weight %, based on the weight of the ferromagnetic metal powder. When polyurethane resins are used, the amount is from 2 to 20 weight %, when polyisocyanate is used, the amount is from 2 to 20 weight %, and it is preferred to use them in combination, however, for instance, when corrosion of heads is caused by a slight amount of chlorine due to dechlorination, it is possible to use polyurethane alone or a combination of polyurethane and isocyanate alone. When a vinyl chloride resin is used as other resin, the addition amount is preferably from 5 to 30 weight %. When polyurethane is used in the present invention, the polyurethane has a glass transition temperature of from −50 to 150° C., preferably from 0 to 100° C., breaking extension of from 100 to 2,000%, breaking stress of from 0.49 to 98 MPa (from 0.05 to 10 kg/mm²), and a yielding point of from 0.49 to 98 MPa (from 0.05 to 10 kg/mm²).

The magnetic recording medium according to the present invention may comprise two or more layers on one side of a support. Accordingly, the amount of the binder, the amounts of vinyl chloride resins, polyurethane resins, polyisocyanate or other resins contained in the binder, the molecular weight of each resin constituting the magnetic layer, the amount of polar groups, or the above described physical properties of resins can of course be varied in the nonmagnetic layer and the magnetic layer, according to necessity. These factors should be rather optimized in respective layers. Well-known prior techniques with respect to multilayer magnetic layers can be used in the present invention. For example, when the amount of the binder is varied in each layer, it is effective to increase the amount of the binder contained in the magnetic layer to reduce scratches n the surface of the magnetic layer. For improving the head ouch against a head, it is effective to increase the amount of the binder in the nonmagnetic layer to impart flexibility.

The examples of polyisocyanates usable in the invention include isocyanates, e.g., tolylenediisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate and triphenylmethanetriisocyanate; products of these isocyanates with polyalcohols; and polyisocyanates formed by condensation reaction of isocyanates. These isocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These compounds may be used alone, or in combination of two or more in each layer taking advantage of the difference in curing reactivity.

If necessary, additives can be added to a magnetic layer in the invention. As the additives, an abrasive, a lubricant, a dispersant, an auxiliary dispersant, an antifungal agent, an antistatic agent, an antioxidant, a solvent and carbon black can be exemplified. The examples of additives usable in the invention include molybdenum disulfide, tungsten disulfide, graphite, boron nitride, graphite fluoride, silicone oil, silicone having a polar group, fatty acid-modified silicone, fluorine-containing silicone, fluorine-containing alcohol, fluorine-containing ester, polyolefin, polyglycol, polyphenyl ether, aromatic ring-containing organic phosphonic acid, e.g., phenylphosphonic acid, benzylphosphonic acid, phenethylphosphonic acid, α-methylbenzylphosphonic acid, 1-methyl-1-phenethylphosphonic acid, diphenylmethyl-phosphonic acid, biphenylphosphonic acid, benzylphenyl-phosphonic acid, α-cumylphosphonic acid, toluylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, nonylphenylphosphonic acid, and alkali metal salt thereof, alkylphosphonic acid, e.g., octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, isoeicosylphosphonic acid, and alkali metal salt thereof, aromatic phosphoric ester, e.g., phenyl phosphate, benzyl phosphate, phenethyl phosphate, α-methylbenzyl phosphate, 1-methyl-phenethyl phosphate, diphenylmethyl phosphate, biphenyl phosphate, benzylphenyl phosphate, α-cumylphosphate, toluylphosphate, xylylphosphate, ethylphenyl phosphate, cumenyl phosphate, propylphenyl phosphate, butylphenyl phosphate, heptylphenyl phosphate, octylphenyl phosphate, nonylphenyl phosphate, and alkali metal salt thereof, alkylphosphoric ester, e.g., octyl phosphate, 2-ethylhexyl phosphate, isooctyl phosphate, isononyl phosphate, isodecyl phosphate, isoundecyl phosphate, isododecyl phosphate, isohexadecyl phosphate, isooctadecyl phosphate, isoeicosyl phosphate, and alkali metal salt thereof, alkylsulfonic ester and alkali metal salt thereof, fluorine-containing alkylsulfuric ester and alkali metal salt thereof, monobasic fatty acid having from 10 to 24 carbon atoms (which may contain an unsaturated bond or may be branched), e.g., lauric acid, myristic acid, palmitic acid, stearic acid, behenic acid, butyl stearate, oleic acid, linoleic acid, linolenic acid, elaidic acid, erucic acid, and alkali metal salt thereof, fatty acid monoester, fatty acid diester or polyhydric fatty acid ester composed of monobasic fatty acid having from 10 to 24 carbon atoms (which may contain an unsaturated bond or may be branched), e.g., butyl stearate, stearate, octyl stearate, amyl stearate, isooctyl stearate, octyl myristate, butyl laurate, butoxyethyl stearate, anhydrosorbitan monostearate, anhydrosorbitan tristearate, and any one of mono-, di-, tri-, tetra-, penta- or hexa-alcohols having from 2 to 22 carbon atoms (which may contain an unsaturated bond or may be branched), alkoxy alcohol having from 2 to 22 carbon atoms (which may contain an unsaturated bond or may be branched) or monoalkyl ether of alkylene oxide polymerized product, fatty acid amide having from 2 to 22 carbon atoms, and aliphatic amines having from 8 to 22 carbon atoms. Besides the above hydrocarbon groups, those having a nitro group, an alkyl, aryl, or aralkyl group substituted with a group other than a hydrocarbon group, such as halogen-containing hydrocarbon, e.g., F, Cl, Br, $CF_3$, $CCl_3$, $CBr_3$, may be used.

In addition, nonionic surfactants, e.g., alkylene oxide, glycerol, glycidol, alkylphenyl ethylene oxide adduct, etc., cationic surfactants, e.g., cyclic amine, ester amide, quaternary ammonium salts, hydantoin derivatives, heterocyclic rings, phosphoniums and sulfoniums, anionic surfactants containing an acid group, e.g., carboxylic acid, sulfonic acid or a sulfuric ester group, and amphoteric surfactants, e.g., amino acids, aminosulfonic acids, sulfuric or phosphoric esters of amino alcohol, and alkylbetaine can also be used. The details of these surfactants are described in *Kaimen Kasseizai Binran* (*Handbook of Surfactants*), Sangyo Tosho Publishing Co., Ltd.

These lubricants and antistatic agents need not be 100% pure and may contain impurities such as isomers, unreacted products, byproducts, decomposed products and oxides, in addition to the main components. However, the content of such impurities is preferably 30 weight % or less, and more preferably 10 weight % or less.

As the specific examples of these additives, e.g., NAA-102, castor oil hardened fatty acid, NAA-42, cation SA, Naimeen L-201, Nonion E-208, Anon BF and Anon LG (manufactured by Nippon Oils and Fats Co., Ltd.), FAL-205 and FAL-123 (manufactured by Takemoto Oil & Fat), Enujerubu OL (manufactured by New Japan Chemical Co., Ltd.), TA-3 (manufactured by Shin-Etsu Chemical Co., Ltd.), Armide P (manufactured by LION AKZO CO., LTD.), Duomeen TDO (manufactured by Lion Corporation), BA-41G (manufactured by The Nisshin OilliO Group, Ltd.), Profan 2012E, Newpole PE61, Ionet MS-400 (manufactured by Sanyo Chemical Industries Ltd.) are exemplified.

Carbon blacks can be added to a magnetic layer in the invention, if necessary. Carbon blacks usable in a magnetic layer include furnace blacks for rubbers, thermal blacks for rubbers, carbon blacks for coloring, and acetylene blacks. Carbon blacks for use in the invention have a specific surface area of from 5 to 500 $m^2/g$, a DBP oil absorption amount of from 10 to 400 ml/100 g, an average particle size of from 5 to 300 nm, a pH value of from 2 to 10, a moisture content of from 0.1 to 10%, and a tap density of from 0.1 to 1 g/ml.

The specific examples of carbon blacks for use in the invention include BLACKPEARLS 2000, 1300, 1000, 900, 905, 800, 700, and VULCAN XC-72 (manufactured by Cabot Co., Ltd.), #80, #60, #55, #50 and #35 (manufactured by ASAHI CARBON CO., LTD.), #2400B, #2300, #900, #1000, #30, #40 and #10B (manufactured by Mitsubishi Kasei Corp.), CONDUCTEX SC, RAVEN 150, 50, 40, 15, and RAVEN-MT-P (manufactured by Columbia Carbon Co., Ltd.), and Ketjen Black EC (manufactured by Nippon EC Co., Ltd.). Carbon blacks may be in advance surface-treated with a dispersant, may be grafted with resins, or a part of the surface may be graphitized before use. Carbon blacks may be previously dispersed in a binder before being added to a coating solution. Carbon blacks can be used alone or in combination. It is preferred to use carbon blacks in an amount of from 0.1 to 30 weight % based on the weight of the magnetic powder. Carbon blacks can serve various functions such as preventing the static charge and reducing the friction coefficient of a magnetic layer, imparting a light-shielding property to a magnetic layer, and improving the film strength of a magnetic layer. Such functions vary by the kind of the carbon black to be used. Accordingly, it is of course possible in the invention to select and determine the kinds, amounts and combinations of carbon blacks to be added to a magnetic layer and a nonmagnetic layer, on the basis of the above-described various properties such as the particle size, the oil absorption amount, the electrical conductance and the pH value, or these should be rather optimized in each layer. With respect to carbon blacks usable in the invention, *Carbon Black Binran* (*Handbook of Carbon Blacks*) (edited by Carbon Black Association) can be referred to.

Well-known organic solvents can be used in the invention. Organic solvents are used in an optional rate in the invention. The examples of organic solvents include ketones, e.g., acetone, methyl ethyl ketone, methyl isobutyl ketone, diisobutyl ketone, cyclohexanone, isophorone and tetrahydrofuran; alcohols, e.g., methanol, ethanol, propanol, butanol, isobutyl alcohol, isopropyl alcohol and methylcyclohexanol; esters, e.g., methyl acetate, butyl acetate, isobutyl acetate, isopropyl acetate, ethyl lactate and glycol acetate; glycol ethers, e.g., glycol dimethyl ether, glycol monoethyl ether and dioxane; aromatic hydrocarbons, e.g., benzene, toluene, xylene, cresol and chlorobenzene; chlorinated hydrocarbons, e.g., methylene chloride, ethylene chloride, carbon tetrachloride, chloroform, ethylene chlorohydrin and dichlorobenzene; and N,N-dimethylformamide and hexane.

These organic solvents need not be 100% pure and they may contain impurities such as isomers, unreacted products, byproducts, decomposed products, oxides and water in addition to their main components. However, the content of such impurities is preferably 30 weight % or less, and more preferably 10 weight % or less. It is preferred that the same kind of organic solvents are used in a magnetic layer and a nonmagnetic layer, but the addition amounts may differ. It is preferred to use organic solvents having high surface tension (such as cyclohexanone, dioxane and the like) in a nonmagnetic layer to increase coating stability. Specifically, it is important for the arithmetic mean value of the surface tension of the composition of the solvents in an upper layer not to be lower than the arithmetic mean value of the surface tension of the composition of the solvents in a lower layer. For improving dispersibility, the porality is preferably strong in a certain degree, and it is preferred that solvents having a dielectric constant of 15 or more account for 50 weight % or more of the composition of the solvents. The dissolution parameter of solvents is preferably from 8 to 11.

The kinds and the amounts of dispersants, lubricants and surfactants for use in the invention can be used differently in a magnetic layer and a nonmagnetic layer described later, according to necessity. For example, although these are not limited to the examples described here, dispersants have a property of adsorbing or bonding by the polar groups, and they are adsorbed or bonded by the polar groups mainly to the surfaces of ferromagnetic metal powder particles in a magnetic layer and mainly to the surfaces of nonmagnetic powder particles in a nonmagnetic layer, and it is supposed that an organic phosphorus compound once adsorbed is hardly desorbed from the surface of metal or metallic compound. Accordingly, the surfaces of ferromagnetic metal powder particles or nonmagnetic powder particles are in the state covered with alkyl groups or aromatic groups, so that the affinity of the ferromagnetic metal powder or nonmagnetic powder to the binder resin is improved, and further the dispersion stability of the ferromagnetic metal powder or nonmagnetic powder is also improved. Further, since lubricants are present in a free state, it is effective to use fatty acids each having a different melting point in a nonmagnetic layer and a magnetic layer so as to prevent bleeding out of the fatty acids to the surface, or different esters each having a different boiling point, a different melting point or a different polarity so as to prevent bleeding out of the esters to the surface. Also, the amount of surfactants is controlled so as to improve the coating stability, or the amount of lubricant in a nonmagnetic layer is made larger so as to improve the lubricating effect. All or a part of the additives to be used in the invention may be added to a magnetic coating solution or a nonmagnetic coating solution in any step of preparation. For example, additives may be mixed with magnetic powder before a kneading step, may be added in a step of kneading magnetic powder, a binder and a solvent, may be added in a dispersing step, may be added after a dispersing step, or may be added just before coating.

[Nonmagnetic Layer]

A nonmagnetic layer is described in detail below. The magnetic recording medium in the invention may have a nonmagnetic layer containing a binder and nonmagnetic powder on a support. The nonmagnetic powder usable in a nonmagnetic layer may be an inorganic substance or an organic substance. Carbon black can also be used in a nonmagnetic layer. As the inorganic substances, e.g., metal, metal oxide, metal carbonate, metal sulfate, metal nitride, metal carbide and metal sulfide are exemplified.

Specifically, titanium oxide, e.g., titanium dioxide, cerium oxide, tin oxide, tungsten oxide, ZnO, $ZrO_2$, $SiO_2$, $Cr_2O_3$, α-alumina having an α-conversion rate of from 90% to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide can be used alone or in combination of two or more. α-Iron oxide and titanium oxide are preferred.

The shape of nonmagnetic powders may be any of an acicular, spherical, polyhedral or tabular shape. The crystallite size of nonmagnetic powders is preferably from 4 nm to 1 μm, and more preferably from 40 to 100 nm. When the crystallite size of nonmagnetic powders is in the range of from 4 nm to 1 μm, dispersion can be performed easily, and preferred surface roughness can be obtained. The average particle size of nonmagnetic powders is preferably from 5 nm to 2 μm, but if necessary, a plurality of nonmagnetic powders each having a different particle size may be combined, or a single nonmagnetic inorganic powder may have broad particle size distribution so as to attain the same effect as such a combination. Nonmagnetic powders particularly preferably have an average particle size of from 10 to 200 nm. When the average particle size is in the range of from 5 nm to 2 μm, preferred dispersibility and preferred surface roughness an be obtained.

Nonmagnetic powders have a specific surface area of from 1 to 100 m$^2$/g, preferably from 5 to 70 m$^2$/g, and more preferably from 10 to 65 m$^2$/g. When the specific surface area is in the range of from 1 to 100 m$^2$/g, preferred surface roughness can be secured and dispersion can be effected with a desired amount of binder. Nonmagnetic powders have an oil absorption amount using DBP (dibutyl phthalate) of generally from 5 to 100 ml/100 g, preferably from 10 to 80 ml/100 g, and more preferably from 20 to 60 ml/100 g; a specific gravity of generally from 1 to 12, and preferably from 3 to 6; a tap density of generally from 0.05 to 2 g/ml, preferably from 0.2 to 1.5 g/ml, when the tap density is in the range of 0.05 to 2 g/ml, particles hardly scatter, handling is easy, and the powders tend not to adhere to the apparatus; pH of preferably from 2 to 11, particularly preferably between 6 and 9, when the pH is in the range of from 2 to 11, the friction coefficient does not increase under high temperature and high humidity or due to liberation of fatty acid; a moisture content of generally from 0.1 to 5 weight %, preferably from 0.2 to 3 weight %, and more preferably from 0.3 to 1.5 weight %, when the moisture content is in the range of from 0.1 to 5 weight %, good dispersion is ensured and coating viscosity after dispersion stabilizes. The ignition loss of nonmagnetic powders is preferably 20 weight % or less, and inorganic powders showing small ignition loss are preferred.

When nonmagnetic powder is inorganic powder, Mohs' hardness is preferably from 4 to 10. When Mohs' hardness is in the range of from 4 to 10, durability can be secured. Nonmagnetic powder has a stearic acid adsorption amount of from 1 to 20 µmol/m$^2$, preferably from 2 to 15 µmol/m$^2$, heat of wetting to water at 25° C. of preferably from 200 to 600 erg/cm$^2$ (from 200 to 600 mJ/m$^2$). Solvents in this range of heat of wetting can be used. The number of the molecules of water at the surface of nonmagnetic powder particle at 100 to 400° C. is preferably from 1 to 10/100 Å. The pH of isoelectric point in water is preferably from 3 to 9. The surfaces of nonmagnetic powders are preferably covered with $Al_2O_3$, $SiO_2$, $TiO_2$, $ZrO_2$, $SnO_2$, $Sb_2O_3$ or ZnO. $Al_2O_3$, $SiO_2$, $TiO_2$ and $ZrO_2$ are particularly preferred in dispersibility, and $Al_2O_3$, $SiO_2$ and $ZrO_2$ are still more preferred. They can be used in combination or can be used alone. According to purposes, a layer subjected to surface treatment by coprecipitation may be used. Alternatively, surfaces of particles may be covered with alumina previously, and then the alumina-covered surface may be covered with silica, or vice versa, according to purposes. A surface-covered layer may be a porous layer, if necessary, but a homogeneous and dense surface is generally preferred.

The specific examples of nonmagnetic powders for use in the a nonmagnetic layer according to the invention include Nanotite (manufactured by Showa Denko Co., Ltd.), HIT-100 and ZA-G1 (manufactured by Sumitomo Chemical Co., Ltd.), DPN-250, DPN-250BX, DPN-245, DPN-270BX, DPB-500BX and DPN-550RX (manufactured by Toda Kogyo Co., Ltd.), titanium oxide TTO-51B, TTO-55A, TTO-55B, TTO-55C, TTO-55S, TTO-55D, SN-100, MJ-7, α-iron oxide E270, E271 and E300 (manufactured by Ishihara Sangyo Kaisha Ltd.), STT-4D, STT-30D, STT-30 and STT-65C (manufactured by Titan Kogyo Kabushiki Kaisha), MT-100S, MT-100T, MT-150W, MT-500B, T-600B, T-100F and T-500HD (manufactured by TAYCA CORPORATION), FINEX-25, BF-1, BF-10, BF-20 and ST-M (manufactured by Sakai Chemical Industry Co., Ltd.), DEFIC-Y and DEFIC-R (manufactured by Dowa Mining Co., Ltd.), AS2BM and $TiO_2$ P25 (manufactured by Nippon Aerosil Co., Ltd.), 100A and 500A (manufactured by Ube Industries, Ltd.), Y-LOP and calcined products of it (manufactured by Titan Kogyo Kabushiki Kaisha) Particularly preferred nonmagnetic powders are titanium dioxide and α-iron oxide.

A desired micro Vickers hardness can be obtained by adding carbon blacks to a nonmagnetic layer with a nonmagnetic powder, surface electrical resistance and light transmittance can be reduced as well. The micro Vickers hardness of a nonmagnetic layer is generally from 25 to 60 kg/mm$^2$ (from 245 to 588 MPa), preferably from 30 to 50 kg/mm$^2$ (from 294 to 940 MPa) for adjusting the head touch. Micro Vickers hardness can be measured using triangular pyramid diamond needle having sharpness of 80° and radius of 0.1 µm attached at the tip of an indenter using a membrane hardness meter HMA-400 (manufactured by NEC Corporation). Light transmittance is standardized that the absorption of infrared ray of wavelength of about 900 nm is generally 3% or less, e.g., the light transmittance of a magnetic tape for VHS is 0.8% or less. For his purpose, furnace blacks for rubbers, thermal blacks for rubbers, carbon blacks for coloring, and acetylene blacks can be used.

Carbon blacks for use in a nonmagnetic layer in the invention have a specific surface area of generally from 100 to 500 m$^2$/g, preferably from 150 to 400 m$^2$/g, a DBP oil absorption of generally from 20 to 400 ml/100 g, preferably from 30 to 200 ml/100 g, an average particle size of generally from 5 to 80 nm, preferably from 10 to 50 nm, and more preferably from 10 to 40 nm, pH of generally from 2 to 10, a moisture content of from 0.1 to 10% by weight, and a tap density of preferably from 0.1 to 1 g/ml.

The specific examples of carbon blacks for use in a nonmagnetic layer of the invention include BLACKPEARLS 2000, 1300, 1000, 900, 800, 880, 700, and VULCAN XC-72 (manufactured by Cabot Co., Ltd.), #3050B, #3150B, #3250B, #3750B, #3950B, #950, #650B, #970B, #850B and MA-600 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.).

Carbon blacks for use in the present invention may previously be surface-treated with a dispersant, may be grafted with a resin, or a part of the surface thereof may be graphitized before use. Carbon blacks may be previously dispersed in a binder before addition to a coating solution. Carbon blacks can be generally used within the range not exceeding 50 weight % based on the above inorganic powders and not exceeding 40 weight % based on the total weight of the nonmagnetic layer. These carbon blacks can be used alone or in combination. Regarding carbon blacks for use in a nonmagnetic layer in the present invention, for example, compiled by Carbon Black Association, *Carbon Black Binran* (*Handbook of Carbon Blacks*) can be referred to.

Organic powders can be used in a nonmagnetic layer according to purpose. The examples of such organic powders include acryl styrene resin powder, benzoguanamine resin powder, melamine resin powder and a phthalocyanine pigment. In addition, polyolefin resin powders, polyester resin powders, polyamide resin powders, polyimide resin powders and polyethylene fluoride resin powders can also be used. The producing methods of these organic powders are disclosed in JP-A-62-18564 and JP-A-60-255827.

Binder resins, lubricants, dispersants, additives, solvents, dispersing methods, etc., used for a magnetic layer can be used in a nonmagnetic layer. In particular, with respect to the amounts and the kinds of binder resins, and the amounts and the kinds of additives and dispersants, well-known prior techniques regarding magnetic layers can be applied to a nonmagnetic layer according to the present invention.

[Backing Layer, Undercoat Layer]

In general, a magnetic tape for computer data recording is decidedly required to have excellent repeating running properties as compared with a video tape and an audio tape. For maintaining such high running durability, a backing layer is provided on the side of a support opposite to the side having a magnetic layer. A backing layer coating solution comprises particle components such as an abrasive and antistatic agent and the like and a binder dispersed in a solvent. As the particle components, various inorganic pigments and carbon blacks can be used. As the binder, resins, for example, nitrocellulose, phenoxy resin, vinyl chloride resin and polyurethane can be used alone or as mixture.

An adhesive layer may be provided on the coating surface of a magnetic layer coating solution and a backing layer coating solution of a support. Further, the magnetic recording medium in the invention may be provided with an undercoat layer. Adhesion of a support and a magnetic layer or a nonmagnetic layer can be improved by providing an undercoat layer. Polyester resins soluble in a solvent are used as the undercoat layer. The thickness of the undercoat layer is 0.5 µm or less.

[Layer Constitution]

The support thickness of a magnetic recording medium for use in the invention is generally from 3 to 80 µm. The thickness of the support of a magnetic tape is from 3.5 to 7.5 µm, preferably from 3 to 7 µm. When an undercoat layer is provided between a support and a nonmagnetic layer or a magnetic layer, the thickness of the undercoat layer is from 0.01 to 0.8 µm, preferably from 0.02 to 0.6 µm. The thickness of a backing layer provided on the opposite side to the side on which a magnetic layer and a nonmagnetic layer are provided is from 0.1 to 1.0 µm, preferably from 0.2 to 0.8 µm.

The thickness of a magnetic layer of the magnetic recording medium of the invention is optimized according to the saturation magnetization amount of the head used, the head gap length, and the recording signal zone, and is generally from 10 to 150 nm, preferably from 20 to 80 nm, and more preferably from 30 to 80 nm. The fluctuation of a magnetic layer thickness is preferably not more than ±50%, and more preferably not more than ±40%. A magnetic layer comprises at least one layer, or may be separated to two or more layers each having different magnetic characteristics, and well-known constitutions of multilayer magnetic layers can be used in the invention.

The thickness of a nonmagnetic in the present invention is generally from 0.5 to 2.0 µm, preferably from 0.8 to 1.5 µm, and more preferably from 0.8 to 1.2 µm. The nonmagnetic layer of the recording medium of the invention exhibits the effect of the invention so long as it is substantially a nonmagnetic layer even if, or intentionally, it contains a small amount of magnetic powder as an impurity, which is as a matter of course regarded as essentially the same constitution as in the invention. The term "substantially a nonmagnetic layer" means that the residual magnetic flux density of the nonmagnetic layer is 100 mT or less and the coercive force of the nonmagnetic layer is 7.96 kA/m (100 Oe) or less, preferably the residual magnetic flux density and the coercive force are zero.

[Manufacturing Method]

The manufacturing process of a magnetic coating solution of the magnetic recording medium in the invention comprises at least a kneading step, a dispersing step and optionally a mixing step to be carried out before and/or after the kneading and dispersing steps. Each of these steps may be composed of two or more separate stages. All of the raw material such as ferromagnetic metal powder, nonmagnetic powder, a binder, carbon black, an abrasive, an antistatic agent, a lubricant and a solvent for use in the invention may be added at any step at any time. Each raw material may be added at two or more steps dividedly. For example, polyurethane can be added dividedly at a kneading step, a dispersing step, or a mixing step for adjusting viscosity after dispersion. For achieving the object of the invention, conventionally well-known techniques can be performed partly with the above steps. Powerful kneading machines such as an open kneader, a continuous kneader, a pressure kneader or an extruder are preferably used in a kneading step. When a kneader is used, all or a part of the binder (preferably 30% or more of the total binders) is kneaded in the range of from 15 parts to 500 parts per 100 parts of the magnetic powder or nonmagnetic powder together with the magnetic powder or nonmagnetic powder. These kneading treatments are disclosed in detail in JP-A-1-106338 and JP-A-1-79274. For dispersing a magnetic layer coating solution and a nonmagnetic layer coating solution, glass beads can be used, but dispersing media having a high specific gravity, e.g., zirconia beads, titania beads and steel beads are preferred for this purpose. Optimal particle size and packing density of these dispersing media have to be selected. Well-known dispersers can be used in the invention.

In the manufacturing method of the magnetic recording medium in the invention, a magnetic layer is formed by coating a magnetic coating solution in a prescribed thickness on the surface of a support under running. A plurality of magnetic layer coating solutions may be multilayer-coated successively or simultaneously, or a nonmagnetic layer coating solution and a magnetic layer coating solution may be multilayer-coated successively or simultaneously. Air doctor coating, blade coating, rod coating, extrusion coating, air knife coating, squeeze coating, impregnation coating, reverse roll coating, transfer roll coating, gravure coating, kiss coating, cast coating, spray coating and spin coating can be used for coating the above magnetic layer coating solution or nonmagnetic layer coating solution. These coating methods are described, e.g., in Saishin Coating Gijutsu (The Latest Coating Techniques), Sogo Gijutsu Center Co. (May 31, 1983).

In the case of a tape-like magnetic recording medium, ferromagnetic metal powder contained in a coated layer of a magnetic layer coating solution is subjected to orientation in the machine direction using a cobalt magnet and a solenoid. In the case of a magnetic disc, isotropic orienting property can be sufficiently obtained in some cases without performing orientation with orientating apparatus, but it is preferred to use well-known random orientation apparatus, e.g., disposing cobalt magnets diagonally and alternately or applying an alternating current magnetic field with a solenoid. In the case of ferromagnetic metal powder, isotropic orienting property is generally two dimensional random orientation is preferred, but it is possible to make three dimensional random orientation by applying perpendicular factor. Hexagonal ferrite magnetic powders have generally an inclination for three-dimensional random orientation of in-plane and in the perpendicular direction, however, it is also possible to make in-plane two-dimensional random orientation. It is also possible to impart isotropic magnetic characteristics in the circumferential direction by perpendicular orientation using well-known methods, e.g., using different pole and counter position magnets. In particular, perpendicular orientation is preferred when the disc is used in high density recording. Circumferential orientation can be performed using spin coating.

In orientation, it is preferred that the drying position of a coated film be controlled by controlling the temperature and the amount of drying air and coating rate. Coating rate is preferably from 20 to 1,000 m/min and the temperature of drying air is preferably 60° C. or more. Preliminary drying can be performed appropriately before entering a magnet zone.

After drying, the coated layer is generally subjected to surface smoothing treatment with, e.g., a super calender roll and the like. The voids generated by the removal of the solvent in drying disappear by the surface smoothing treatment and the packing rate of the ferromagnetic metal powder in the magnetic layer increases, so that a magnetic recording medium having high electromagnetic conversion characteristics can be obtained. Heat resisting plastic rolls, e.g., epoxy, polyimide, polyamide and polyimideamide are used in calendering treatment. Metal rolls can also be used in calendering treatment.

It is preferred for the magnetic recording medium in the invention to have surface smoothness of as high as from 0.1 to 4 nm of central plane average surface roughness at a cut-off value of 0.25 mm, more preferably from 1 to 3 nm. Such high smoothness can be obtained by forming a magnetic layer by using the specific ferromagnetic metal powder and binder as described above, and subjecting the magnetic layer to calendering treatment. As the conditions of calendering treatment, the temperature of calender rolls is from 60 to 100° C., preferably from 70 to 100° C., and particularly preferably from 80 to 100° C., the pressure is from 100 to 500 kg/cm (from 98 to 490 kN/m), preferably from 200 to 450 kg/cm (from 196 to 441 kN/m), and particularly preferably from 300 to 400 kg/cm (from 294 to 392 kN/m).

For reducing a heat shrinkage factor, there are a method of performing heat treatment of a magnetic recording medium in a web state while handling under low tension, and a method of performing heat treatment of a tape as a pile, e.g., in a bulk state or a state of being encased in a cassette (a thermo treatment method), and both methods can be used. From the point of providing a magnetic recording medium of high output and low noise, a thermo treatment method is preferred.

A magnetic recording medium obtained is cut in a desired size with a cutter. The cutter is not particularly restricted, but those having a plurality of pairs of rotating upper blade (a male blade) and lower blade (a female blade) are preferred, so that a slitting rate, the depth of intermesh, peripheral ratio of upper blade (a male blade) and lower blade (a female blade) (peripheral speed of upper blade/peripheral speed of lower blade), and the continuous working time of slitting blades can be arbitrarily selected.

[Physical Characteristics]

The saturated flux density of a magnetic layer of the magnetic recording medium for use in the invention is preferably from 100 to 300 mT. The coercive force (Hr) of a magnetic layer is preferably from 143.3 to 318.4 kA/m (from 1,800 to 4,000 Oe), more preferably from 159.2 to 278.6 kA/m (from 2,000 to 3,500 Oe). The coercive force distribution is preferably narrow, and SFD and SFDr is preferably 0.6 or less, more preferably 0.2 or less.

The magnetic recording medium in the invention has a friction coefficient against a head at temperature of −10° C. to 40° C. and humidity of 0% to 95% of 0.5 or less, preferably 0.3 or less, surface intrinsic viscosity of a magnetic surface is from $10^4$ to $10^{12}$ Ω/sq, and a charge potential of preferably from −500 V to +500 V. The elastic modulus at 0.5% elongation of a magnetic layer is preferably from 0.98 to 19.6 GPa (from 100 to 2,000 kg/mm²) in every direction of in-plane, breaking strength is preferably from 98 to 686 MPa (from 10 to 70 kg/mm²), the elastic modulus of a magnetic recording medium is preferably from 0.98 to 14.7 GPa (from 100 to 1,500 kg/mm²) in every direction of in-plane, the residual elongation is preferably 0.5% or less, and the thermal shrinkage factor at every temperature of 100° C. or less is preferably 1% or less, more preferably 0.5% or less, and most preferably 0.1% or less.

The glass transition temperature of a magnetic layer (the maximum point of the loss elastic modulus by dynamic viscoelasticity measurement at 110 Hz) is preferably from 50° C. to 180° C., and that of a nonmagnetic layer is preferably from 0° C. to 180° C. The loss elastic modulus is preferably in the range of from $1 \times 10^7$ to $8 \times 10^8$ Pa ($1 \times 10^8$ to $8 \times 10^9$ dyne/cm²), and loss tangent is preferably 0.2 or less. When loss tangent is too large, adhesion failure is liable to occur. These thermal and mechanical characteristics are preferably almost equal in every direction of in-plane of the medium with difference of not more than 10%.

The residual amount of a solvent in a magnetic layer is preferably 100 mg/m² or less, more preferably 10 mg/m² or less. The void ratio of a coated layer is preferably 30% by volume or less, more preferably 20% by volume or less, with both of a nonmagnetic layer and a magnetic layer. The void ratio is preferably smaller for obtaining high output but in some cases a specific value should be preferably secured depending on purposes. For example, in a disc medium that is repeatedly used, large void ratio contributes to good running durability in many cases.

A magnetic layer preferably has a maximum height (SR-$_{max}$) of 0.5 μm or less, a ten-point average roughness (SRz) of 0.3 μm or less, a central plane peak height (SRp) of 0.3 μm or less, a central plane valley depth (SRv) of 0.3 μm or less, a central plane area factor (SSr) of from 20 to 80%, and average wavelength (Sλa) of from 5 to 300 μm. These can be easily controlled by the control of the surface property of a support by using fillers or by the surface configurations of the rolls of calender treatment. Curling is preferably within ±3 mm.

When the magnetic recording medium of the invention comprises a nonmagnetic layer and a magnetic layer, these physical properties can be varied according to purposes in a nonmagnetic layer and a magnetic layer. For example, the elastic modulus of a magnetic layer is made higher to improve running durability and at the same time the elastic modulus of a nonmagnetic layer is made lower than that of the magnetic layer to improve the head touching of the magnetic recording medium.

EXAMPLE

The present invention will be described more specifically with referring to examples. The components, ratios, operations and orders described herein can be changed without departing from the spirit and scope of the invention, and these are not limited to the following examples. In the examples "parts" means "weight parts" unless otherwise indicated.

Manufacture of Medium Nos. T1 to T33:

<Preparation for Coating Solutions>

Magnetic Layer Coating Solution 1 (Hexagonal Ferrite):

| | |
|---|---|
| Barium ferrite magnetic powder (shown in Table 1) | 100 parts |
| Vinyl chloride copolymer MR555 (manufactured by Nippon Zeon Co., Ltd.) | 6 parts |
| Polyurethane resin | 3 parts |

-continued

| | |
|---|---|
| UR8200 (manufactured by Toyobo Co., Ltd.) | |
| α-Alumina (average particle size: 0.3 μm) | 2 parts |
| HIT55 (manufactured by Sumitomo Chemical Co., Ltd.) | |
| Carbon black (average particle size: 0.015 μm) #55 (manufactured by ASAHI CARBON CO., LTD.) | 5 parts |
| Butyl stearate | 1 part |
| Stearic acid | 2 parts |
| Methyl ethyl ketone | 125 parts |
| Cyclohexanone | 125 parts |

Magnetic Layer Coating Solution 2 (Ferromagnetic Metal):

| | |
|---|---|
| Ferromagnetic metal powder | 100 parts |
| Vinyl chloride copolymer MR110 (manufactured by Nippon Zeon Co., Ltd.) | 12 parts |
| Polyurethane resin UR8200 (manufactured by Toyobo Co., Ltd.) | 3 parts |
| α-Alumina (average particle size: 0.3 μm) HIT55 (manufactured by Sumitomo Chemical Co., Ltd.) | 2 parts |
| Carbon black #55 (manufactured by ASAHI CARBON CO., LTD.) | 1 part |
| Butyl stearate | 1 part |
| Stearic acid | 5 parts |
| Methyl ethyl ketone | 100 parts |
| Cyclohexanone | 20 parts |
| Toluene | 60 parts |

Nonmagnetic Coating Solution 3 (For Nonmagnetic Layer):

| | |
|---|---|
| Nonmagnetic powder α-Fe$_2$O$_3$ (hematite) Average major-axis length: 0.15 μm, Specific surface area by BET method: 52 m$^2$/g, pH: 8 Tap density: 0.8 DBP oil absorption amount: 27 to 38 ml/100 g, Surface covering compound: Al$_2$O$_3$, SiO$_2$ | 80 parts |
| Carbon black Average particle size: 16 nm, DBP oil absorption amount: 80 ml/100 g, pH: 8.0, Specific surface area by BET method: 250 m$^2$/g, Volatile content: 1.5% | 20 parts |
| Vinyl chloride copolymer MR110 (manufactured by Nippon Zeon Co., Ltd.) | 12 parts |
| Polyester polyurethane resin | 5 parts |
| α-Al$_2$O$_3$ (average particle size 0.2 μm) | 1 part |
| Butyl stearate | 1 part |
| Stearic acid | 1 part |
| Methyl ethyl ketone | 100 parts |
| Cyclohexanone | 50 parts |
| Toluene | 50 parts |

With each of the above compositions of magnetic layer coating solution 1, magnetic layer coating solution 2 and nonmagnetic coating solution 3, components were kneaded in a kneader, and then dispersed in a sand mill for 4 hours. Three parts of polyisocyanate was added to each resulting dispersion solution. Further, 40 parts of cyclohexanone was added to each solution, and each solution was filtered through a filter having an average pore diameter of 1 μm to obtain coating solutions for forming a nonmagnetic layer and a magnetic layer. The nonmagnetic layer-forming coating solution and magnetic layer-forming coating solution were simultaneously coated, or the magnetic layer-forming coating solution was coated after the lower layer was coated and dried, on a support having a thickness of 6.0 μm (shown in Table 2). The nonmagnetic layer-forming coating solution was coated in a dry thickness of 1.5 μm and the magnetic layer-forming coating solution was coated in a dry thickness of 0.10 μm. Each sample was subjected to orientation with a cobalt magnet having a magnetic force of 6,000 G (0.6 T) and a solenoid having a magnetic force of 6,000 G (0.6 G) while the magnetic layer was still wet. After drying, the magnetic layer was subjected to calendering treatment by a calender of seven stages comprising metal rolls alone at 85° C. and a velocity of 200 m/min. Thereafter, a backing layer having a thickness of 0.5 μm (100 parts of carbon black having an average particle size of 17 nm, 80 parts of calcium carbonate having an average particle size of 40 nm, and 5 parts of α-alumina having an average particle size of 200 nm were dispersed in nitrocellulose resin, polyurethane resin and polyisocyanate) was coated. The obtained web was slit to a width of ½ inch. The magnetic layer surface of the manufactured tape was cleaned with a tape cleaning apparatus having a delivery and a winding-up movement of a slit product to which a nonwoven fabric and a razor blade were attached so as to be pressed against the magnetic surface of the tape, thereby a tape sample was obtained.

The details of support are as follows.

Supports B-2 to B-5 were obtained by changing the filler density of support B-1, supports B-6 and B-7 were obtained by changing the filler diameter of support B-1, supports B-8 to B-11 were obtained by changing the intrinsic viscosity of the polymer, and support B-12 was an example of 2,6-polyethylene naphthalate of two-layer structure.

Support B-1:
   2,6-polyethylene naphthalate (monolayer)
   thickness: 6.0 μm
   filler size: 27 nm, 10 nm
   filler density: 10/100 μm$^2$
   intrinsic viscosity: 0.53 dl/g
   MD Young's modulus: 850 kg/mm$^2$ (8.33 GPa)
   TD Young's modulus: 650 kg/mm$^2$ (6.37 GPa)

Support B-2:
   2,6-polyethylene naphthalate (monolayer)
   filler density: 48/100 μm$^2$
   intrinsic viscosity: 0.53 dl/g Support B-3:
   2,6-polyethylene naphthalate (monolayer)
   filler density: 20/100 μm$^2$
   intrinsic viscosity: 0.53 dl/g Support B-4:
   2,6-polyethylene naphthalate (monolayer) (comparative example)
   filler density: 80/100 μm$^2$
   intrinsic viscosity: 0.53 dl/g Support B-5:
   2,6-polyethylene naphthalate (monolayer) (comparative example)
   filler density: 0.5/100 μm$^2$
   intrinsic viscosity: 0.53 dl/g Support B-6:
   2,6-polyethylene naphthalate (monolayer)
   filler size: 10 nm, 480 nm
   intrinsic viscosity: 0.53 dl/g Support B-7:
   2,6-polyethylene naphthalate (monolayer) (comparative example)
   filler size: 10 nm, 600 nm
   intrinsic viscosity: 0.53 dl/g Support B-8:
 2,6-polyethylene naphthalate (monolayer)
 filler density: 10/100 μm²
 intrinsic viscosity: 0.59 dl/g
Support B-9:
 2,6-polyethylene naphthalate (monolayer)
 filler density: 10/100 μm²
 intrinsic viscosity: 0.40 dl/g
Support B-10:
 2,6-polyethylene naphthalate (monolayer) (comparative example)
 filler density: 10/100 μm²
 intrinsic viscosity: 0.70 dl/g
Support B-11:
 2,6-polyethylene naphthalate (monolayer)
 filler density: 10/100 μm²
 intrinsic viscosity: 0.35 dl/g
Support B-12:
 2,6-polyethylene naphthalate (two layers)
 thickness: 6.0 μm
 first layer filler size: 10 nm
 first layer filler density: 5/100 μm²
 intrinsic viscosity: 0.53 dl/g
 second layer filler size: 10 nm, 25 nm
 second layer filler density: 7/100 μm²
 intrinsic viscosity: 0.53 dl/g
 first layer thickness/second layer thickness: 1.0/2.8
 average filler number on the cross section: 7/100 μm²
Support B-13:
 aromatic polyamide (monolayer) (comparative example)
 thickness: 6.0 μm
 filler size: 80 nm
 filler density: 30/100 μm²
 MD Young's modulus: 850 kg/mm² (8.33 GPa)
 TD Young's modulus: 650 kg/mm² (6.37 GPa)

The performances of each magnetic tape obtained were evaluated, and the results obtained are shown in Table 2 below.

Method of Evaluation:

1. Measurement of Intrinsic Viscosity

A support was dissolved in a mixed solvent comprising phenol/1,1,2,2-tetrachloroethane (60/40 by weight), and the measurement was performed with an automatic viscometer set with Ubbelohde's viscometer at 25° C.

2. Measurements of Filler Size and Filler Density

A sample for observation was prepared by embedding a small piece of a magnetic tape in an epoxy resin adhesive, forming the tip of the embedded block in an appropriate shape and size and cutting a cross-section with a microtome. The prepared sample of the cross section was photographed with a transmission electron microscope model FE-SEM S-800 (manufactured by Hitachi Limited) at a magnification of 20,000 times and a filler size and filler density of the cross section of the support were obtained.

3. Measuring Method of C/N Ratio

Reel-to-reel tester loading an MR head of commercial product was used in the measurement of C/N ratio under the following conditions.
 Relative speed: 2 m/sec,
 Recording track width: 18 μm,
 Reproducing track width: 10 μm,
 Distance between shields: 0.27 μm,
 Signal generator for recording: 8118A manufactured by HP Co.
 Reproducing signal process: spectrum analyzer.

4. Measuring Method of Durability

Running apparatus of running speed of 5 m/s was produced using 613A drive (3480 type, recording and reproducing apparatus for ½ inch cartridge magnetic tape, manufactured by Fujitsu Limited). Edge damage after running of 10,000 passes was examined.
Good: Damage did not occur.
Fair: Damage occurred but practicable.
No good: Impracticable by the damage.

TABLE 1

| Ferromagnetic Powder | Kind | Volume of Particle ($10^{-18}$ ml) | Hc (Oe) | Hc (kA/m) | σs (A·m²/kg) |
|---|---|---|---|---|---|
| A | BaF | 6 | 2,460 | 197 | 54 |
| B | BaF | 3 | 2,480 | 198 | 51 |
| C | BaF | 1.5 | 2,510 | 201 | 57 |
| D | BaF | 0.5 | 3,060 | 245 | 56 |
| E | BaF | 10 | 3,520 | 282 | 58 |
| F | MP | 7 | 2,350 | 188 | 120 |
| G | MP | 3 | 2,350 | 188 | 120 |
| H | MP | 0.8 | 2,310 | 185 | 110 |
| I | MP | 12 | 2,500 | 200 | 142 |

BaF: Barium ferrite powder
MP: Ferromagnetic metal powder

TABLE 2

| Medium No. | Remarks | Kind of Support | Kind of Ferromagnetic Powder | Durability | CN Ratio (dB) |
|---|---|---|---|---|---|
| T1 | Example | B-1 | A | Good | 0 |
| T2 | Example | B-1 | B | Good | 0.5 |
| T3 | Example | B-1 | C | Good | 1.5 |
| T4 | Example | B-1 | D | Good | 2.5 |
| T4 | Comp. Ex. | B-1 | E | Good | −1.5 |
| T5 | Example | B-1 | F | Good | −0.5 |
| T6 | Example | B-1 | G | Good | 0.4 |
| T7 | Example | B-1 | H | Good | 2.5 |
| T8 | Comp. Ex. | B-1 | I | Good | −2 |
| T9 | Example | B-2 | A | Fair | 0 |
| T10 | Example | B-2 | G | Fair | 0.4 |
| T11 | Example | B-3 | A | Good | 0 |
| T12 | Example | B-3 | G | Good | 0.4 |
| T13 | Comp. Ex. | B-4 | A | No good | −0.5 |
| T14 | Comp. Ex. | B-4 | G | No good | 0.2 |
| T15 | Comp. Ex. | B-5 | A | No good | 0.3 |
| T15 | Comp. Ex. | B-5 | G | No good | 0.8 |
| T16 | Example | B-6 | A | Good | −0.5 |
| T17 | Example | B-6 | G | Good | 0.2 |
| T18 | Comp. Ex. | B-7 | A | Good | −1.5 |
| T19 | Comp. Ex. | B-7 | G | Good | −1 |
| T20 | Example | B-8 | A | Fair | 0 |
| T21 | Example | B-8 | G | Fair | 0.5 |
| T22 | Example | B-9 | A | Fair | 0 |
| T23 | Example | B-9 | G | Fair | 0.5 |
| T24 | Comp. Ex. | B-10 | A | No good | 0 |
| T25 | Comp. Ex. | B-10 | G | No good | 0.5 |
| T26 | Comp. Ex. | B-11 | A | No good | 0 |
| T27 | Comp. Ex. | B-11 | G | No good | 0.5 |
| T28 | Example | B-12 | A | Good | 0.2 |
| T29 | Example | B-12 | C | Good | 1.8 |
| T30 | Example | B-12 | G | Good | 0.6 |
| T31 | Example | B-12 | H | Good | 2.8 |
| T32 | Comp. Ex. | B-13 | A | No good | 0.5 |
| T33 | Comp. Ex. | B-13 | G | No good | 0.8 |

It can be seen from the results in Table 2 that the samples according to the invention are excellent both in durability and CN ratio but the samples in comparative examples are inferior at least in either of them.

The present invention is not limited to the specific above-described embodiments. It is contemplated that numerous modifications may be made to the present invention without departing from the spirit and scope of the invention as defined in the following claims.

What is claimed is:

1. A magnetic recording medium comprising: a nonmagnetic support; a magnetic layer containing a ferromagnetic powder has a volume of $0.1 \times 10^{-18}$ to $1 \times 10^{-18}$ ml and a binder on one side of the nonmagnetic support; and a backing layer on other side of the nonmagnetic support, wherein the nonmagnetic support consists essentially of a polyester film having an intrinsic viscosity of from 0.40 to 0.60 dl/g, and contains fillers having filler diameters of from 10 to 500 nm at a filler density of from $1/100$ to $50/100$ $\mu m^2$.

2. The magnetic recording medium according to claim 1, wherein the filler diameter and the filler density was determined by observing a cross section of the nonmagnetic support.

3. The magnetic recording medium according to claim 1, wherein the intrinsic viscosity is from 0.46 to 0.56 dl/g.

4. The magnetic recording medium according to claim 1, wherein the filler diameter is from 10 to 250 nm.

5. The magnetic recording medium according to claim 1, wherein the filler density is from $1/100$ to $20/100$ $\mu m^2$.

6. The magnetic recording medium according to claim 1, wherein the filler comprises: at least one of an inorganic powder selected from a spherical silica, a colloidal silica, a titanium oxide and an alumina; and an organic filler selected from a crosslinked polystyrene and a silicone resin.

7. The magnetic recording medium according to claim 1, wherein the nonmagnetic support has a thickness of 3 to 80 µm.

8. The magnetic recording medium according to claim 1, wherein the polyester film has Young's modulus in a machine direction of from 7.0 to 8.6 Gpa and that in a transverse direction of from 5.4 to 8.0 Gpa.

9. The magnetic recording medium according to claim 1, which further comprises a nonmagnetic layer between the nonmagnetic support and the magnetic layer.

10. The magnetic recording medium according to claim 1, which further comprises an undercoat layer between the nonmagnetic support and the magnetic layer.

11. The magnetic recording medium according to claim 9, which further comprises an undercoat layer between the nonmagnetic support and the nonmagnetic layer.

\* \* \* \* \*